A. M. SAUNDERS & F. N. SPELLER.
APPARATUS FOR TESTING TUBES.
APPLICATION FILED JUNE 9, 1911.
1,036,912.
Patented Aug. 27, 1912.
2 SHEETS—SHEET 1.
FIG. 5
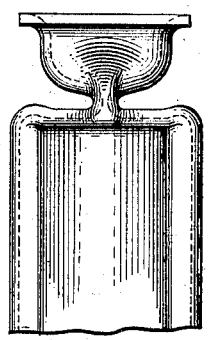
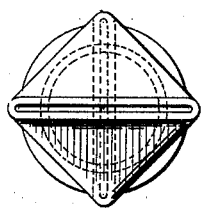
FIG. 4
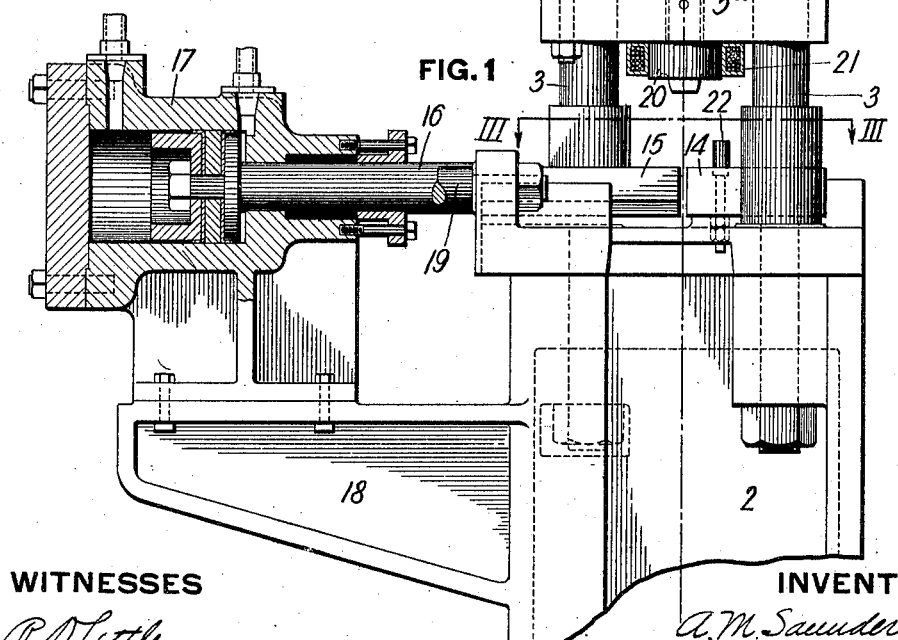
FIG. 1
WITNESSES
R D Little
M P Alexander
INVENTOR
A. M. Saunders
F. N. Speller
by Linthicum, Belt & Fuller
their Attorneys A. M. SAUNDERS & F. N. SPELLER.
APPARATUS FOR TESTING TUBES.
APPLICATION FILED JUNE 9, 1911.

1,036,912.

Patented Aug. 27, 1912.

2 SHEETS—SHEET 2.

WITNESSES

INVENTOR

UNITED STATES PATENT OFFICE.

AUGUSTUS M. SAUNDERS, OF McKEESPORT, AND FRANK N. SPELLER, OF PITTSBURGH, PENNSYLVANIA, ASSIGNORS TO NATIONAL TUBE COMPANY, OF PITTSBURGH, PENNSYLVANIA, A CORPORATION OF NEW JERSEY.

APPARATUS FOR TESTING TUBES.

1,036,912.     Specification of Letters Patent.     Patented Aug. 27, 1912.

Application filed June 9, 1911. Serial No. 632,221.

*To all whom it may concern:*

Be it known that we, AUGUSTUS M. SAUNDERS, of McKeesport, and FRANK N. SPELLER, of Pittsburgh, in the county of Allegheny and State of Pennsylvania, have invented certain new and useful Improvements in Apparatus for Testing Tubes, of which the following is a full, clear, and exact description, reference being had to the accompanying drawings, forming part of this specification.

Our invention relates to the testing of boiler tubes and similar annular articles before the tubes are put to the use for which they are ultimately intended, and more particularly relates to the crushing and flanging tests to which sections or short pieces of the tubes are usually subjected as part of the steps employed in manufacturing such tubes.

The invention further relates to the construction and arrangement of apparatus used in making such tests of novel construction and having improved means for effecting the testing operations.

Heretofore, in testing tubes, it has been the practice to take a short section of tube and in subjecting it to the crushing test flatten it by means of a hammer or a hydraulic press. Another piece or the same piece of the tube is then flanged on one end to effect the flanging test, these operations being entirely separate and independent of each other.

One object of our invention is to provide tube testing apparatus having novel means whereby the crushing and flanging tests are applied and carried out, the time required in making the tests is greatly reduced and the expense connected with the testing operation is lessened.

Another object of this invention is to provide improved apparatus for carrying out the testing operations by the use of which the tubes or tube sections are subjected to a more rigid and severe test than heretofore.

A further object of this invention is to provide pipe testing apparatus having novel means for mechanically holding the pipe sections in position until after the crushing test is started and completed.

Figure 2:
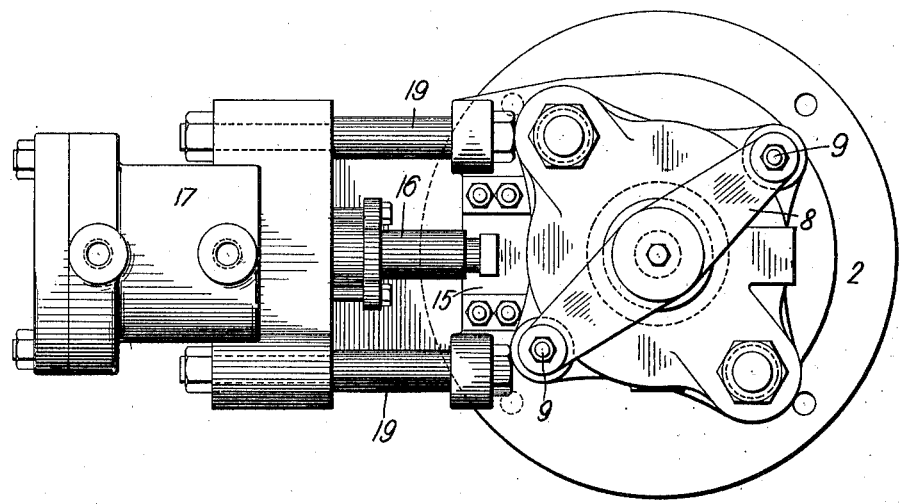
Figure 3:
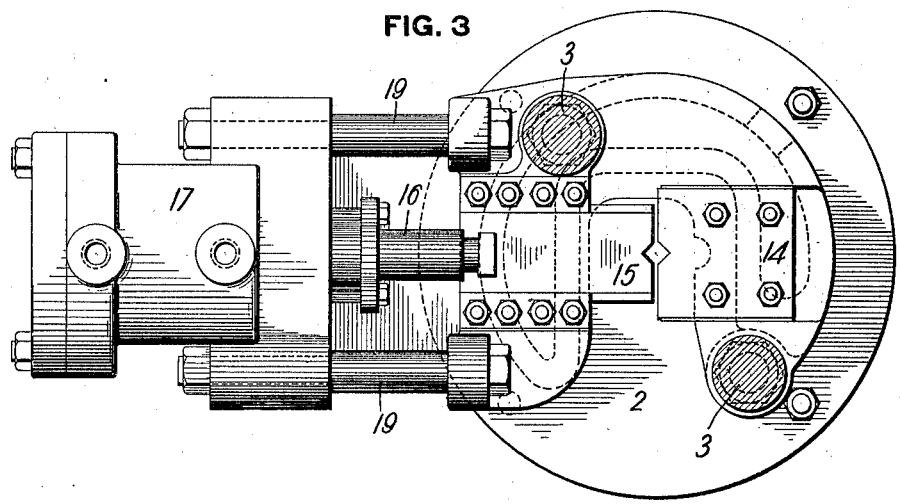

In the accompanying drawings, Figure 1 is a side elevation partly in section showing one form of testing apparatus constructed and arranged in accordance with our invention. Fig. 2 is a plan of the apparatus shown in Fig. 1. Fig. 3 is a sectional plan on the line III—III of Fig. 1 showing the construction of the jaws of the testing apparatus by which the crushing test is applied and by which the pipe is clamped and held in position while being subjected to the flanging test. Fig. 4 is a plan and Fig. 5 a side elevation of a section of pipe showing the shape into which the cylindrical sections or pieces of pipe are pressed in subjecting the sections of pipe to the crushing and the flanging tests.

Referring to the drawings 2 designates the base of our improved testing apparatus having secured thereto by means of the bolts 3 a single acting hydraulic cylinder 4. Mounted in the cylinder 4 is a vertically movable plunger 5 and the lower end of the plunger is provided with a flange 5ª having openings therein through which the bolts 3 extend so as to form guides for the movable plunger.

On the top end of the hydraulic cylinder 4 is a smaller pull-back cylinder 6 having a plunger 7 therein. The upper end of the plunger 7 is provided with a cross-head 8. The cross-head 8 is connected by means of bolts 9 with the flanged end of the plunger 5 in the cylinder 4. The cylinder 4 is provided with a stuffing box 10 and gland 11 and the pull-back cylinder 6 also is provided with a stuffing box 12 and gland 13 so as to prevent leakage from these cylinders.

Removably secured on the top of the base 2 of the apparatus is a detachable clamping jaw 14 and opposite this clamping jaw is a horizontally reciprocating clamping jaw 15 which is shown secured by one end to the outer end of the piston rod 16 for the horizontal double acting cylinder 17. The cylinder 17 is mounted on the shelf or bracket 18 which is formed integral on one side of the base 2 of the apparatus. The cylinder 17 is also fastened to the top end of the base 2 by means of the horizontally extending tie bolts 19.

Removably secured in a recess located in the lower end of the vertically movable plunger 5 for the cylinder 4 is a flanging die 20 which is constructed and arranged to engage with and flange the ends of sections of pipe to be tested after the flanging test has been accomplished and while the pipe section is being held in position between the opposing crushing and clamping jaws 14 and 15. Preferably a magnet coil 21 is provided on the plunger 5 which is arranged to surround, and, when energized, to magnetize the flanging die 20, the coil as shown moving vertically with the flanging die 20.

As will be best seen from Figs. 1 and 3, a vertically extending recess having an open side is provided in the base plate 2 so that pieces of pipe of varying lengths can be placed in position between the clamping jaws 14 and 15.

Mounted on the base of the apparatus is a stop 22 which is detachably secured in place on the base 2, this stop being detachable so that by substituting one stop for another of a different length the downward stroke of the plunger 5 may be varied to suit the conditions required.

In the operations of testing the pipe by means of our improved apparatus forming this invention, the parts are erected together in place as shown and the inlets to the fluid pressure cylinders forming part of the apparatus are connected to a source of fluid pressure supply, suitable controlling valves being provided to regulate the supply of fluid to these cylinders. The horizontally movable clamping jaw 15 is then retracted by means of the cylinder 17 and the flanging die 20 is raised until in the position shown in the drawings. When a boiler tube is cut to length in the course of its manufacture, the operative takes the crop-end or relatively short piece cut from the tube and places it in position between the clamping jaws 14 and 15 with its upper end in engagement with the lower surface of the flanging die 20. The magnet coil 21, when employed, is energized so that the die 20 will be magnetized, and when so magnetized, this die 20 will hold or maintain the crop-end or piece of tube in position in engagement with its lower face. Fluid pressure is then admitted to the cylinder 17 so as to advance the clamping jaw 15 into the position shown in Fig. 1. In this operation the portion of the length of the pipe engaged by the clamping jaws 14 and 15 is crushed flat so as to test the pipe for crushing. Fluid pressure is then admitted to the cylinder 4 and the flanging die 20 is caused to descend and is lowered until the face of this die is engaged by the stop 22. By the downward movement of the die 20, the upper end of the section of tube then being gripped between the clamping jaws 14 and 15 is flanged so as to determine the flanging qualities of the particular tube being tested. By the same downward movement of the die 20 the tube becomes bulged outwardly between the flattened portion formed by the first or flanging test and now being held between the jaws 14 and 15, and the upper end of the tube in contact with the die 20 is simultaneously flanged so that any defects will be indicated in the crop end or piece of tube being tested. (See Figs. 4 and 5.) The above described operations are then repeated upon the crop ends of the successive tubes as the tubes are cut to length, and in this way each tube is subjected to a crushing and a flanging test while by first subjecting the piece of tube to the crushing test and then subjecting the same piece of tube to a flanging test, the tube is tested much more severely than has been the case heretofore and, should the pipe stand this test, it can be considered practically certain that the tube from which the tested section is cut is a marketable product.

Modifications in the construction and arrangement of the parts forming the testing apparatus may be made without departing from our invention as defined in the appended claims.

We claim:—

1. Apparatus for testing tubes and the like comprising a tube clamping mechanism arranged to crush and hold the flattened tube sections while being flanged, a flanging mechanism adapted to engage with and flange the uncrushed end of the flattened tube sections grasped by the clamping mechanism, and means for actuating the clamping and flanging mechanisms.

2. Apparatus for testing tubes and the like comprising a tube clamping mechanism arranged to crush and hold the flattened tube sections while being flanged, a flanging mechanism arranged to engage and flange the uncrushed end of the flattened tube sections in the grasp of the clamping mechanism, means for holding the tube sections in engagement with the flanging mechanism while actuating the clamping mechanism to crush and flatten the tube sections, and means for actuating the tube clamping and flanging mechanisms.

3. In apparatus for testing tubes and the like the combination with mechanism for flanging the end of the tubes being tested and mechanism for clamping and holding the tubes while being flanged of means whereby the tubes are held in position against the flanging mechanism while being grasped by the tube clamping mechanism, and means for actuating the tube clamping and flanging mechanisms.

4. In apparatus for testing tubes and the like the combination with a base having a vertically extending recess or slot in one side thereof and a horizontally adjustable tube clamping mechanism mounted on said base, of a vertically movable flanging mechanism above the clamping mechanism arranged to engage and flange the end of a tube section held in position by the clamping mechanism and means for actuating said tube clamping and flanging mechanisms.

5. Apparatus for testing tubes and the like comprising a base having a vertically extending recess or slot in one side thereof, relatively movable clamping jaws above said slot arranged to grasp and crush tubes placed between said jaws, a fluid pressure cylinder for actuating the clamping jaws to crush and hold the tubes being tested, a vertically movable piston above the clamping jaws having a flanging die removably secured thereon, a fluid pressure cylinder secured on said base in which the piston is mounted and means for supplying fluid pressure to said cylinder to actuate the flanging die and flange the end of tube sections held between the jaws of said clamping mechanism.

6. Apparatus for testing tubes and the like comprising a base having a vertically extending recess or slot in one side thereof, relatively movable clamping jaws above said slot arranged to grasp and crush tubes placed between said jaws, a fluid pressure cylinder for actuating the clamping jaws to crush and hold the tubes being tested, a vertically movable piston above the clamping jaws having a flanging die removably secured thereon, a fluid pressure cylinder secured on said base in which the piston is mounted and means for supplying fluid pressure to said cylinders to actuate the clamping jaws and the flanging die and flange the end of tube sections held between the jaws of said clamping mechanism, and a magnet coil surrounding the flanging die to magnetize the die and thereby magnetically hold tubes in position against the flanging die while being crushed and flattened by the jaws of the clamping mechanism.

7. Apparatus for testing tubes and the like comprising a base having a vertically extending recess or slot in one side thereof, relatively movable clamping jaws above said slot arranged to grasp and crush tubes placed between said jaws, a fluid pressure cylinder for actuating the clamping jaws to crush and hold the tubes being tested, a vertically movable piston above the clamping jaws having a flanging die removably secured thereon, a fluid pressure cylinder secured on said base in which the piston is mounted and means for supplying fluid pressure to said cylinders to actuate the clamping jaws and the flanging die and flange the end of tube sections held between the jaws of said clamping mechanism.

In testimony whereof, we have hereunto set our hands.

AUGUSTUS M. SAUNDERS.
FRANK N. SPELLER.

Witnesses:
JAS. P. DAVIS,
THOS. W. BELL.

---

Copies of this patent may be obtained for five cents each, by addressing the "Commissioner of Patents, Washington, D. C."